United States Patent Office 2,764,609
Patented Sept. 25, 1956

2,764,609

ISOMERIZATION OF DIALKYL MALEATES TO DIALKYL FUMARATES

Harry R. Gamrath, St. Louis, Mo., assignor to Monsanto Chemical Company, St. Louis, Mo., a corporation of Delaware No Drawing. Application July 24, 1953,
Serial No. 370,211

16 Claims. (Cl. 260—485)

This invention relates to a process for producing esters of fumaric acid and more particularly refers to a process for isomerizing alkyl maleates to alkyl fumarates.

The conversion of alkyl maleates to alkyl fumarates by isomerization in the presence of a catalyst is well known. Various catalytic substances such as bromine, sulfur, salts of dithio acids, potassium and the like have been employed; however, they will not generally provide high yields of products of the desired degree of purity. Some of them require elaborate technique and are ineffective at conveniently low temperatures.

The primary purpose of this invention is to provide a simple and economical method of isomerizing alkyl esters of maleic acid to alkyl esters of fumaric acid. A further purpose of the present invention is to provide an isomerization catalyst which may be employed at lower temperatures than hitherto feasible. A still further purpose of the invention is to provide a rapid isomerization method utilizing as isomerization catalyst a halide of an acid of phosphorus or of sulfur. Still further purposes will be apparent from the following description of the invention.

According to the present invention, the isomerization is conducted in the presence of a catalyst consisting of a chloride, bromide, fluoride or iodide of an acid of phosphorus or of sulfur. The isomerization catalysts suitable for use are, for example, phosphorus oxychloride, phosphorus oxybromide, phosphorus oxyiodide, phosphorus oxyfluoride, phosphorus tribromide, phosphorus trichloride, phosphorus triiodide, phosphorus trifluoride, 2-ethylhexyl phosphoryl dichloride, di(2-ethylhexyl) phosphoryl monochloride, phosphorus thiobromide, thionyl bromide, thionyl fluoride, hexadecane sulfone chloride, toluene sulfone chloride, chlorosulfonic acid, sulfur monobromide, sulfur monochloride, sulfur dichloride, sulfuryl chloride, sulfuryl fluoride and the like.

The invention includes the isomerization of esters of maleic acid to esters of fumaric acid and esters of halomaleic acid such as chloromaleic acid or bromomaleic acid to esters of halofumaric acid, such as chlorofumaric acid or bromofumaric acid.

The isomerization is conducted by charging the ester to a suitable reaction vessel and heating. Then the catalyst is added and the mass temperature is maintained within the range of 50 to 150° C. for a suitable period of time. The isomerization may also be carried out in the presence of inert solvents such as chloroform, tetrachloroethylene, chlorobenzene, benzene, toluene, octane and the like. By the proper selection of a solvent, the isomerization temperature may be maintained at the desired temperature level by operating under the reflux condition of the selected medium.

Although isomerization temperatures from 50° to 150° C. are satisfactory, the isomerization will take place even at room temperature (i. e. about 25° C.) but generally in impracticable time periods. Choice of isomerization temperatures is mainly dependent on the isomerization time periods. Naturally, the lower temperatures require the longer time periods. The preferred isomerization temperature is within the range of 80° to 110° C.

Catalysts may be employed in any amount up to 0.1 mole per mole of maleate ester, however, the preferred quantity per mole of ester is from 0.001 mole to 0.05 mole. The catalyst may be charged to the ester initially, or after the ester has been heated to the desired isomerization temperature.

The esters prepared in accordance with this method are reasonably pure and may be used without further purification wherever a technical quality is satisfactory. Esters which are liquid at room temperature may be purified, if necessary, by distillation, whereas dimethyl fumarate, a solid, is readily refined by crystallization from methanol. Other means of purification may be employed which will be apparent to those skilled in the art.

Further details in the practice of this invention are set forth in the following examples:

Example 1

A suitable reaction vessel fitted with a mechanical stirring device, thermometer and exhaust vent, was charged with 144 grams (1 mole) of dimethyl maleate. The mixture was heated and stirred until the mass temperature reached 100° C. 1.5 grams (0.01 mole) of phosphorus oxychloride were then added and the whole stirred for about two hours at 100° to 110° C. After cooling, 142.1 grams of dimethyl fumarate were recovered, corresponding to a yield of 98.7%.

Example 2

The procedure of Example 1 was repeated, except that 7.5 grams (0.05 mole) of phosphorus oxychloride were used as catalyst. A yield of 99.7% dimethyl fumarate was recovered.

Example 3

The procedure described in Example 1 was employed to isomerize 144 grams (1 mole) of dimethyl maleate by means of 2.4 grams (0.02 mole) of thionyl chloride. The dimethyl fumarate was recovered in a 99.1% yield.

Example 4

The procedure of Example 1 was repeated using 144 grams (1 mole) of dimethyl maleate and 2.75 grams (0.02 mole) of phosphorus trichloride. Dimethyl fumarate with a melting point of 92–96° C. was recovered in a yield of 100.5%.

In the following examples the dimethyl fumarate samples were recrystallized from methanol for which reason a somewhat lower yield is obtained.

Example 5

A mixture of 72 grams (0.5 mole) of dimethyl maleate and 0.375 gram (0.0025 mole) of phosphorus oxychloride was heated at 100° to 110° C. The ester was then cooled to about 80° C. and 96 grams of methanol were added. The mixture was further heated until complete solution resulted. After cooling to about 15° C., 52.8 grams of refined dimethyl fumarate, corresponding to a yield of 73.3%, were recovered.

Example 6

Employing the procedure of Example 5, 28.8 grams (0.2 mole) of dimethyl maleate and 0.18 gram (0.004 mole) of phosphorus tribromide were reacted. After recrystallization, the yield of dimethyl fumarate was 81.2%.

Example 7

The procedure of Example 5 was repeated, except that 14.4 grams (0.1 mole) of dimethyl maleate were isomerized by 0.49 gram (0.002 mole) of 2-ethylhexyl phosphoryl dichloride. The yield of refined dimethyl fumarate was 11.7 grams or 81.2%.

Example 8

The procedure of Example 5 was repeated using 14.4 grams (0.1 mole) of dimethyl maleate and 0.34 gram (0.001 mole) of di(2-ethylhexyl) phosphoryl monochloride. The melting point of the recovered dimethyl fumarate was 102.8° C.

Example 9

As in Example 5, 144 grams (1 mole) of dimethyl maleate and 1.7 grams (0.01 mole) of phosphorus thiochloride were heated. Dimethyl fumarate melting at 102° C. was obtained in substantial yield.

Example 10

Following the procedure of Example 5, dimethyl fumarate was prepared from 72 grams (0.5 mole) of dimethyl maleate and 4.75 grams (0.025 mole) of p-toluenesulfone chloride. The melting point of the recovered product was 101.6° C.

Example 11

The procedure of Example 5 was repeated using 28.8 grams (0.2 mole) of dimethyl maleate and 1.95 grams (0.006 mole) of hexadecane sulfone chloride. The melting point of the recovered dimethyl fumarate was 101.8° C.

Example 12

The procedure of Example 5 was repeated using 144 grams (1 mole) of dimethyl maleate and 1.17 grams (0.01 mole) of chlorosulfonic acid. The melting point of the recovered dimethyl fumarate was 100.9° C.

Example 13

A round-bottom, three-neck flask equipped with a thermometer, reflux condenser and a stirrer was charged with 344 grams (2 moles) of diethyl maleate and 4.8 grams (0.04 mole) of thionyl chloride. The mass was heated and stirred at a temperature of 115–125° C. for about 2.5 hours, and then distilled directly. From the fraction boiling at 100–106° C. under 10–11 mm. mercury absolute pressure, a yield of 97.9% of diethyl fumarate with a crystallizing point of −2.2° C. was obtained.

Example 14

Following the procedure as described in the preceding example, diethyl chlorofumarate was prepared using 206.5 grams (1 mole) of diethyl chloromaleate and 3.01 grams (0.02 mole) of phosphorus oxychloride.

Example 15

114.1 grams (0.5 mole) of dibutyl maleate were charged to a round-bottom, three-neck flask equipped with a thermometer, reflux condenser and a stirrer, and heated to 110° C. 3.0 grams (0.02 mole) of phosphorus oxychloride were added and the mass stirred at this temperature for 6 hours. The resulting product was cooled and 250 cc. of water added. The mixture was then neutralized with sodium carbonate, the aqueous layer removed and the ester steamed to remove volatile matter. A yield of 111.7 grams or 97.9% of di-n-butyl fumarate having a crystallizing point of −19.5° C. was obtained.

Example 16

The reaction was conducted in a manner similar to that of Example 15, but employing a mixture of di(6-methylheptyl) maleate and phosphorus oxychloride. Di(6-methylheptyl) fumarate with a crystallizing point of −38° C. was obtained in good yield.

Example 17

By procedure similar to that described in Example 15, dicapryl maleate was isomerized to dicapryl fumarate using phosphorus oxychloride as catalyst.

Example 18

In a manner similar to that described for Example 15, di-n-octyl maleate was isomerized with phosphorus oxychloride to di-n-octyl fumarate. The yield of di-n-octyl fumarate, having a crystallizing point of +14.5° C., was 96.6%.

Example 19

In a manner similar to that described for Example 15 di(2-ethylhexyl) maleate was isomerized to di(2-ethylhexyl) fumarate by means of phosphorus oxychloride.

Example 20

In a manner such as that described in Example 15, tetradecyl maleate was isomerized with phosphorus oxychloride to tetradecyl fumarate.

Example 21

A round-bottom, three-neck flask equipped with a thermometer, reflux condenser and a stirrer was charged with 114 grams (0.5 mole) of dibutyl maleate, 100 grams of toluene, and 3.0 grams (0.02 mole) of phosphorus oxychloride. This mass was heated to reflux (125–126° C.) and the condition maintained for 6 hours. Thereafter the mass was cooled, treated with 250 cc. of water and the mixture was made just alkaline to phenolphthalein with sodium carbonate. After separating the aqueous phase, the mass was steamed to remove the toluene and other volatile materials, and the residue after dehydration was an essentially quantitative yield of di-butyl fumarate.

Example 22

114 grams (0.5 mole) of dibutyl maleate were stirred and heated to 105° C. 3.0 grams (0.02 mole) of phosphorus oxychloride were then added and the whole stirred at 110° C. for 5 hours. After cooling to about 25° C. and settling, a 100% yield of di-n-butyl fumarate with a crystallizing point of −20.5° C. was recovered by decanting the ester from the insoluble oil.

The invention is defined by the following claims.
What is claimed is:
1. The method of converting an alkyl maleate to an alkyl fumarate which comprises heating the alkyl maleate in the presence of a halide of an acid of a group consisting of acids of sulfur and acids of phosphorus.
2. The method of converting an alkyl maleate to an alkyl fumarate which comprises heating the alkyl maleate at a temperature within the range of 50° C. to 150° C. in the presence of a halide of an acid of a group consisting of acids of sulfur and acids of phosphorus.
3. The method of converting an alkyl maleate to an alkyl fumarate which comprises heating the alkyl maleate in the presence of from 0.001 mole to 0.05 mole of a halide of an acid of a group consisting of acids of sulfur and acids of phosphorus per mole of ester.
4. The method of converting an alkyl maleate to an alkyl fumarate which comprises heating the alkyl maleate at a temperature within the range of 80° to 110° C. in the presence of from 0.001 mole to 0.05 mole of a halide of an acid of a group consisting of acids of sulfur and acids of phosphorus per mole of ester.
5. The method of converting an alkyl maleate to an alkyl fumarate which comprises heating the alkyl maleate in the presence of a halide of an acid of a group consisting of acids of sulfur and acids of phosphorus and in the presence of an organic liquid which is inert under the conditions of the reaction.
6. The method of converting an alkyl maleate to an alkyl fumarate which comprises heating the alkyl maleate at reflux temperature in the presence of from 0.001 mole to 0.05 mole of a halide of an acid of a group consisting of acids of sulfur and acids of phosphorus per mole of ester and in the presence of an organic liquid which is inert under the conditions of the reaction.

7. The method as defined in claim 1 in which the alkyl maleate is dimethyl maleate.

8. The method as defined in claim 1 in which the alkyl maleate is dibutyl maleate.

9. The method as defined in claim 1 in which the alkyl maleate is dioctyl maleate.

10. The method as defined in claim 1 in which the alkyl maleate is di-(6-methylheptyl) maleate.

11. The method as defined in claim 1 in which the alkyl maleate is di-(2-ethylhexyl) maleate.

12. The method as defined in claim 1 in which the halide is phosphorus oxychloride.

13. The method as defined in claim 1 in which the halide is thionyl chloride.

14. The method as defined in claim 1 in which the halide is phosphorus tribromide.

15. The method as defined in claim 1 in which the halide is p-toluene sulfone chloride.

16. The method as defined in claim 1 in which the halide is 2-ethylhexyl phosphoryl dichloride.

References Cited in the file of this patent

Dorp: Rec. Trav. Pays Bas 25, 96–103 (1906).
Beilstein (4th Ed.), Band II, 742 (1920).
Anschutz: Berichte 18, 1947–49.